United States Patent [19]

Egner-Walter

[11] Patent Number: 5,680,669
[45] Date of Patent: Oct. 28, 1997

[54] WIPER ARM ESPECIALLY FOR CLEANING WINDSHIELDS OF MOTOR VEHICLES

[75] Inventor: Bruno Egner-Walter, Heilbronn, Germany

[73] Assignee: ITT Automotive Europe GmbH, Germany

[21] Appl. No.: 608,425

[22] Filed: Feb. 28, 1996

Related U.S. Application Data

[62] Division of Ser. No. 104,096, filed as PCT/EP92/02758, Nov. 28, 1992, Pat. No. 5,502,867.

[30] Foreign Application Priority Data

Dec. 12, 1991 [DE] Germany .......................... 41 40 960.4

[51] Int. Cl.[6] ...................................... B60S 1/32
[52] U.S. Cl. ..................... 15/250.352; 15/250.351; 15/250.31; 16/374; 16/387
[58] Field of Search .................. 15/250.352, 250.351, 15/250.34, 250.31, 250.201; 16/273, 267, 274, 374, 387, 234, 255, 277, 388

[56] References Cited

U.S. PATENT DOCUMENTS

| | | | |
|---|---|---|---|
| 1,626,629 | 5/1927 | Sayre | 15/250.34 |
| 2,353,208 | 7/1944 | Whitted | 15/250.35 |
| 2,847,695 | 8/1958 | Sampson et al. | 15/250.34 |
| 3,061,866 | 11/1962 | Krohm | 15/250.352 |
| 3,216,053 | 11/1965 | Felix | 16/247 |
| 3,950,818 | 4/1976 | Holmes | 16/277 |
| 4,873,744 | 10/1989 | Johnson, Jr. | 16/387 |

FOREIGN PATENT DOCUMENTS

| | | | |
|---|---|---|---|
| 3428795 | 2/1985 | Germany | 15/250.34 |
| 3926714 | 2/1991 | Germany . | |

Primary Examiner—Gary K. Graham
Attorney, Agent, or Firm—J. Gordon Lewis; Thomas N. Twomey

[57] ABSTRACT

A wiper arm for cleaning windshields of motor vehicles. The fixing portion of the wiper arm is formed from sheet metal in a manner which is economical and strong.

3 Claims, 3 Drawing Sheets

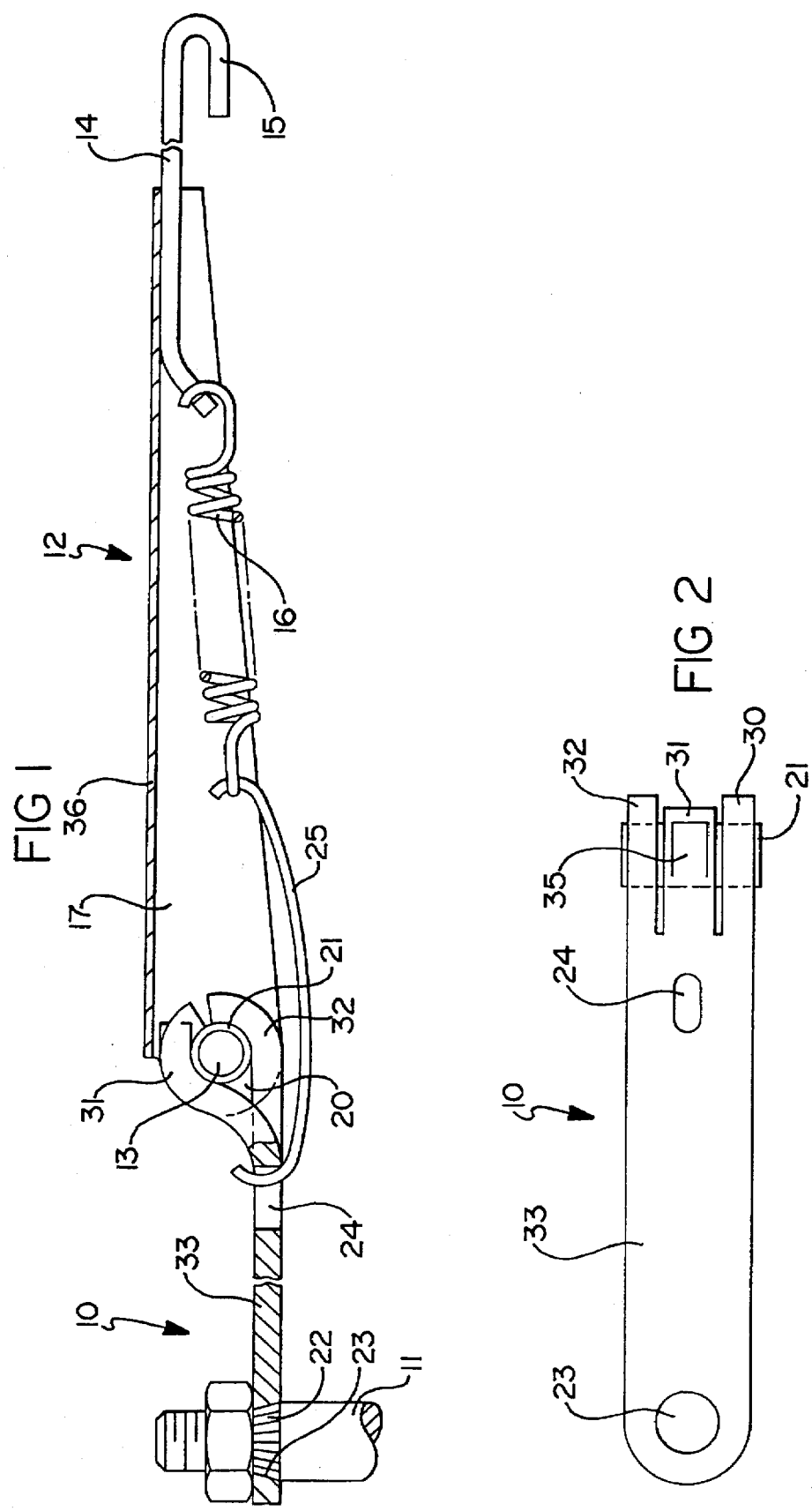

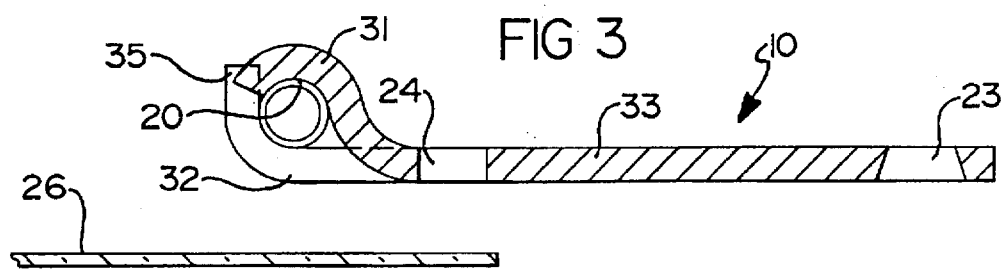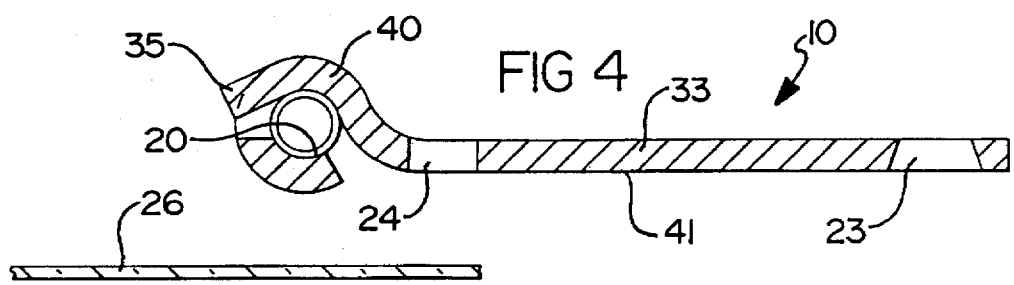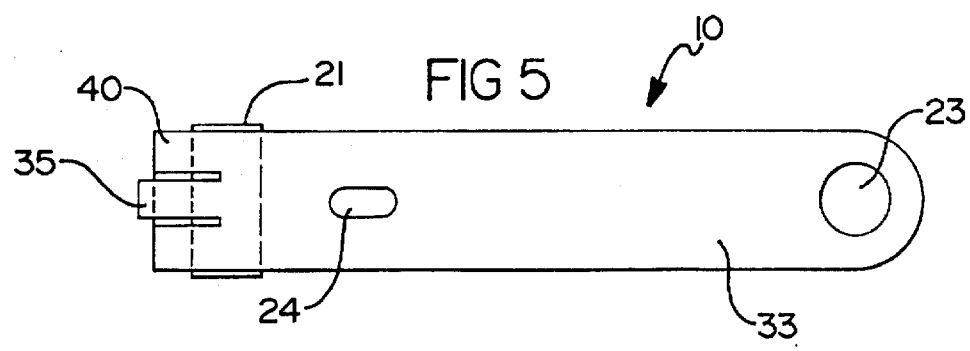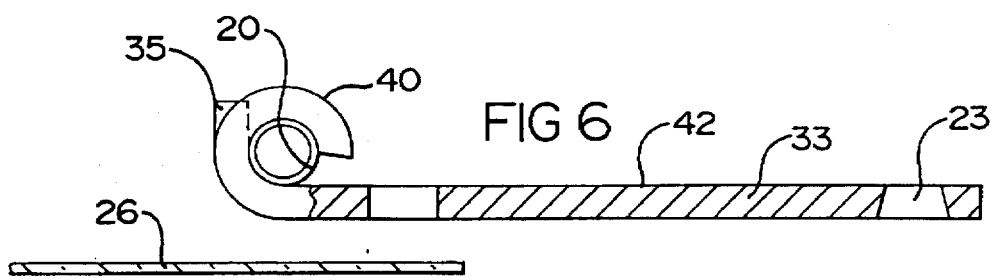

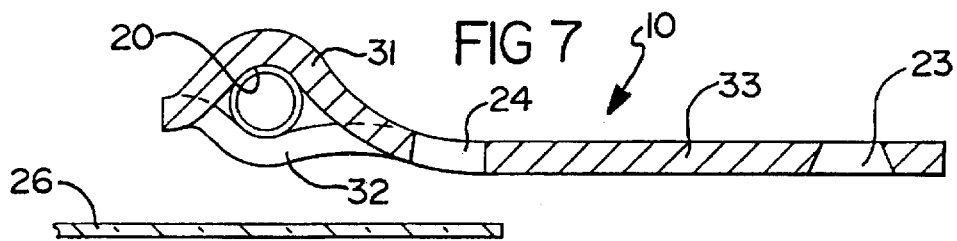
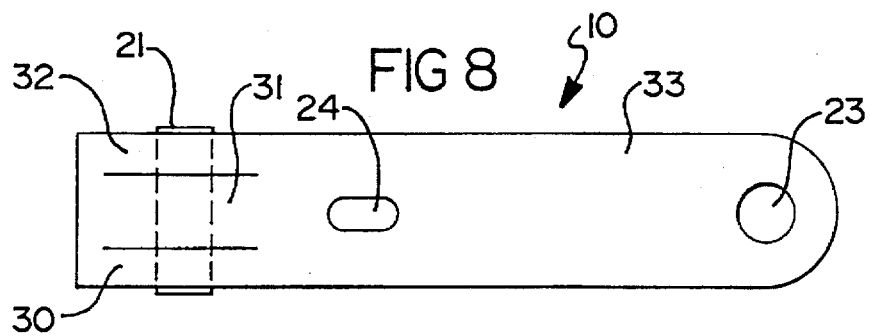
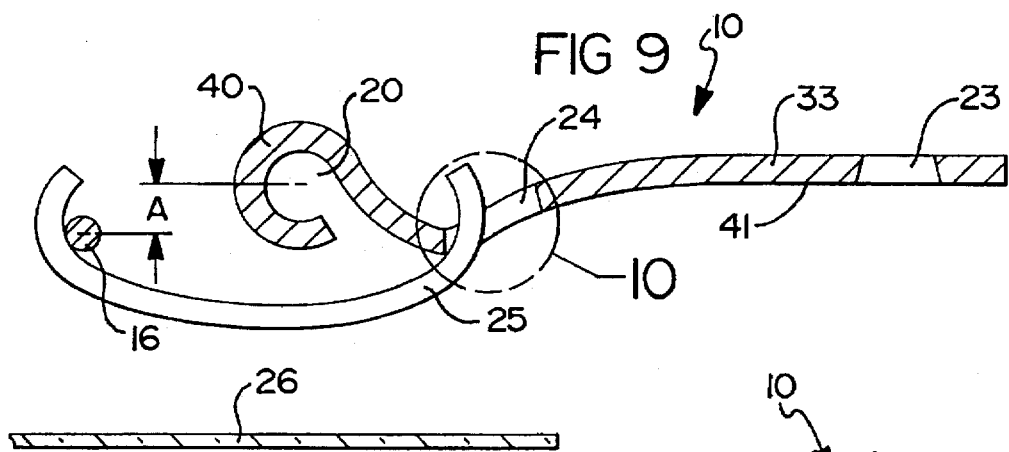
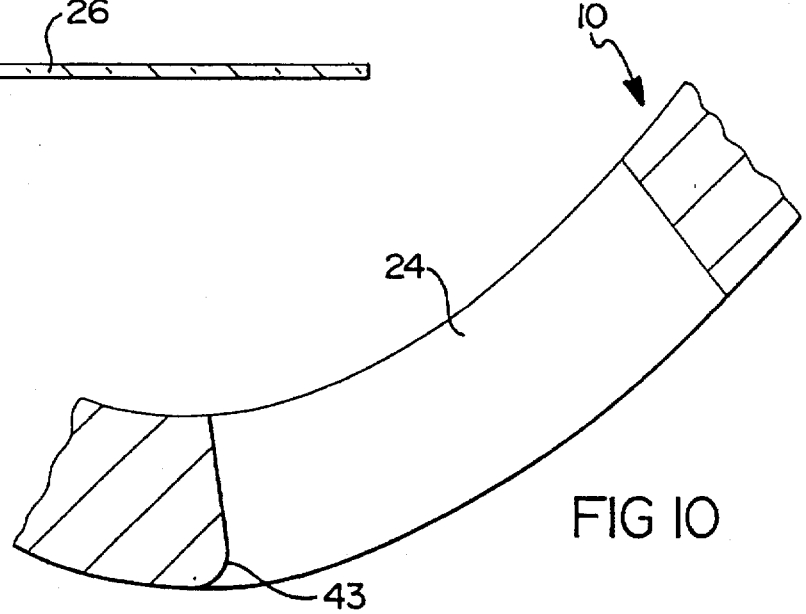

WIPER ARM ESPECIALLY FOR CLEANING WINDSHIELDS OF MOTOR VEHICLES

This is a divisional of application Ser. No. 08/104,096 filed on Nov. 18, 1993 now U.S. Pat. No. 5,502,867 which is a 371 of PCT/EP92/02758 filed on Nov. 28, 1992.

This invention relates to wiper arms, especially those used for cleaning windshields of motor vehicles and comprising a fixing part which is preferably manufactured from sheet metal.

BACKGROUND OF THE INVENTION

The wiper arms used on motor vehicles usually comprise a fixing part, a joing piece, a wiper rod, and a pressure spring. The fixing part is an essential component part, and forms the means by which the wiper arm is non-rotatably seated on a wiper shaft. The fixing part is typically manufactured from diecast zinc or aluminum. The joint piece is typically punched out of sheet metal and brought to a U-shape. The wiper rod, which is rigidly connected with the joint piece, is articulated at the fixing part and can be swivelled with regard to said joint piece. The pressure spring is usually hung up in the fixing part, on the one hands and at the joint piece or at the wiper rod, on the other hand. Such a wiper arm is, for example, known from EP 0 301 131 A1. Because of the manufacturing process and the materials used, a fixing part made by diecasting is an expensive component of the wiper arm. This is particularlly true in modern vehicles because the wiper shaft is arranged to an increasing extent in a slot between the windshield and the vehicle body, and therefore, very long fixing parts are used. Because the fixing parts are normally at least partly visible, high quality requirements are made with regard to the surface, which are difficult to satisfy with diecast parts. This leads to a further increase in the price of the fixing parts.

In order to be able to manufacture wiper arms of the requested quality at reduced cost, it has been already suggested, to manufacture the fixing part, too, as a stamped and bent part from sheet metal. A wiper arm with such a fixing part is, for example, known from DE 34 28 795 A1 or DE 39 26 714 A1. The fixing parts of these wiper arms are provided with a back which lies, at least in sections, in a plane vertically to the wiper shaft, and with two side cheeks which are vertically bent away from the back and which point towards the windshield to be cleaned or point away from it. In the two side cheeks bores are provided coaxially arranged towards each other, which, perhaps with the help of a pressed-in bearing bushing accommodate a hinge pin in order to mount the joint piece swivellably at the fixing part. The openings in the side cheeks have to be formed already when the sheet metal is punched out. Only afterwards is the sheet metal bent and drawn to the shape of the fixing part so that an exact coaxial arrangement of the openings is not guaranteed. Furthermore, the known construction techniques require the use of a relatively great amount of material.

The object of the invention is to develop a wiper arm in such a way that the fixing part can be manufactured from sheet metal by requiring little material and little expenditure in manufacturing, all at a reasonable price.

This object is achieved by the wiper arm of the present invention in the way that the retainer for mounting the joint piece is formed by bending the sheet metal in parallel to the axis of the retainer. In a wiper arm according to the invention, no more side cheeks for the fixing part are necessary in order to form a retainer for a bearing bushing and a hinge pin for mounting the joint piece at the fixing part. In this way material is saved. The problem of the coaxial arrangement of two openings which are distant from each other no longer applies.

In a preferred embodiment, a bearing bushing is pressed into the retainer.

Preferably, the sheet metal is rolled in the way of a strap hinge for forming a retainer.

Also advantageous is a disclosed embodiment in which the fixing part comprises several sections lying behind each other in the area of the retainer in direction to the axis of the retainer, of which sections at least one is bent into the one direction and at least one is bent into the opposite direction. In this embodiment it is not necessary that the single sections completely surround the retainer. It is not even necessary that they overlap in peripherial direction of the retainer. Therefore, it is possible to save material with regard to the solution in the way of the strap hinge. Preferably, each section lying directly one after another is preferably bent in opposite directions so that a pressed in bearing bushing is well supported. An embodiment seems especially useful, in which at least three sections are provided, which are alternately bent in opposite directions and in which the two very outside sections are bent into the same direction. In this way a symmetrical support of a pressed in bearing bushing can be achieved.

The fixing part obtains an especially high stability in the area of the retainer, if sections of the sheet metal bent into opposite directions are connected with each other at both sides of the retainer.

A laterally offset arrangement of the axis of the retainer towards the plane of the sheet metal can be achieved easily, in such a way that a bent section of the fixing part serving for forming the retainer, tangentially changes into a flat section of the fixing part. Should the achievable direction of the offset arrangement not correspond to the requested direction, it is possible to achieve the requested offset arrangement in such a way that the fixing part changes, in a section serving for forming the retainer and bent in a certain direction, into a bend which is opposite to the bend of said section.

For attaching the pressure spring the sheet metal is advantageously provided with an opening which is situated in front of the retainer in the sheet metal, seen from a bore for placing upon the wiper shaft. In order to obtain a large distance between the axis of the retainer and the line of effect of the pressure spring the support point of the pressure spring is situated in the opening in the area of the bottom side of the sheet metal turned towards the windshield which is to be cleaned. A support at this edge can be usefully achieved in the way that the sheet metal is inclined in the area of the opening towards the windshield which is to be cleaned. If the pressure spring supports itself at an edge of the opening towards the bottom side of the sheet metal, the height of the sheet metal is used to great extent to receive a large distance between between the axis of the retainer and the line of effect of the spring. This means on the contrary that the wiper arm can be manufactured very flatly in the area of the joint between the fixing part and the joint piece.

Wiper arms for motor vehicles usually comprise a stop for the joint piece in the area of the retainer so that the fixing part and the joint piece can be buckled against each other only in a very obtuse angle by the pressure spring before the wiper arm is assembled at the motor vehicle. Advantageously, such a stop is also formed at a wiper arm of the present invention. The stop is preferably cut out of a section of the sheet metal of the fixing part which is bent for forming the retainer. In particular, the stop can be formed by a straight, lengthened end of a section of the sheet metal of the fixing part bent for forming the retainer.

Several embodiments of a wiper arm according to the invention, of which in part only the corresponding fixing part is shown, are presented in the drawings. The invention is now explained in detail by means of the Figures of these drawings.

FIG. 1 is a cross-sectional side view of a first embodiment of the wiper arm of the present invention fixed on a wiper shaft, in which the retainer is formed by sections of the fixing part bent in opposite directions.

FIG. 2 is a top view on the mere fixing part according to FIG. 1.

FIG. 3 is a cross-sectional side view of a modified embodiment of the fixing part according to FIGS. 1 and 2 with another development of the stop for the joint piece.

FIG. 4 is in longitudinal cross-sectional side view of an embodiment of a fixing part, in which the retainer is formed by rolling the sheet metal in the way of a strip hinge.

FIG. 5 is a top view on the fixing part according to FIG. 4.

FIG. 6 is a further embodiment of a fixing part, in which the retainer is formed by rolling the sheet metal in the way of a strap hinge.

FIG. 7 is an embodiment of a fixing part, in which sections of the sheet metal, which are bent in different directions, are connected with each other for forming the retainer, at both sides of the retainer.

FIG. 8 is a top view on the fixing part according to FIG. 7.

FIG. 9 is an embodiment, in which the fixing part is bent towards the windshield in the area of an opening for hanging up the pressure spring.

FIG. 10 is an enlarged presentation of the detail X of FIG. 9.

According to FIG. 1 the essential component parts of the wiper arm are a fixing part 10, by means of which the wiper arm is non-rotatably fastened into a wiper shaft 11, a U-shaped joint piece 12, formed of one sheet metal, which joint piece is swivellably coupled with the fixing part by means of a pin 13, a wiper rod 14 which is bent to a hook 15 at its free end and which is rigidly connected with the joint piece 12 by crimping at the other end, and a pressure spring 16 which is attached up at the fixing part 10 and at the wiper rod 14 and which, in particular, extends within the joint piece 12. The fixing part 10 is formed by a sheet metal of an elongated shape, which extends from the wiper shaft 11 in longitudinal direction of the complete wiper arm. At its end remote from the wiper shaft 11 the fixing part is provided with a retainer 20, into which a bearing bushing 21 is pressed, which axially projects slightly from the sheet metal of the fixing part so that the side cheeks 17 of the fixing part 12 can bear against said bearing bushing 21. Seen from the joint piece 12 behind the retainer 20, the fixing part 10 consists of unprofiled, massive material such as steel or aluminum. For placing upon a conical and knurled section 22 of the wiper shaft 11, the fixing part is provided with a conical bore 23, which is sub-punched and then countersunk when the sheet metal blank for the fixing part is punched.

Seen from the bore 23 in front of the retainer 20, an opening 24 is punched out of the sheet metal forming the fixing part, into which opening the pressure spring 16 is attached by way of a bow 25.

Now referring to FIGS. 1 and 2, in the area of the retainer 20 the fixing part 10 is provided with three sections 30, 31 and 32 lying behind each other in the direction of the axis of the retainer 20. The two outside sections 30 and 32 are bent upwards from the plane of the sheet metal in parallel to the axis of the retainer 20, and they tangentially change over into the flat section 33 of the sheet metal. The middle section 31 is bent around the retainer 20 opposite to the two sections 30 and 32, and it changes into the flat section 33 of the fixing part 10 in a bend which is opposite to its bend. On the whole an offset arrangement of the axis of the retainer 20 from the plane of the section 33 results from this fact. The free ends of the section 30 and 32, on the one hand, and of the section 31, on the other hand, do not overlap, as can be clearly seen from FIG. 1, but maintain a spaced relationship with each other. However, a reliable fixation of the bearing bushing 21 is not impaired by this.

A stop 35 is cut out of the middle section 31 and extends tangentially to section 31 of the retain 20 and projects from this section. The joint piece 12 can bear against said section 31 by means of its back 36 so that the collapsing of the wiper arm, because of the power of the pressure spring 16, is restricted by the stop 35.

The embodiment according to FIG. 3 is similar to the one of FIGS. 1 and 2 as far as the retainer 20 is again formed by the sections 30, 31 and 32, which are bent according to the corresponding sections of the embodiment according to FIGS. 1 and 2. There is a difference only with regard to the stop 35 for the joint piece 12. The sections 30 and 32 are longer than in the embodiment according to FIGS. 1 and 2 and they extend with a straight end in upward direction from the windshield 26 which is to be cleaned vertically to the plane of the sections 33. Each upwardly extending end is a stop 35 for the joint piece 12. Both stops 35 act in parallel.

In the two embodiments according to FIGS. 4, 5 and 6 there are not several sections bent in to different directions, lying behind each other in direction of the axis of the retainer 20. On the contrary, for fanning the retainer 20 one single section 40 of the sheet metals forming the fixing part 10 is rolled in the way of a strap hinge, namely the section 40 in the embodiment according to the FIGS. 4 and 5 is rolled in such a way that its free end is situated at the bottom side 41 of the fixing part turned towards the windshield which is to be cleaned. So that the axis of the retainer 20 is offset in upward direction with regard to the retainer 33 of the fixing part 10, that means it is placed at the other side of the section 33 than the windshield to be cleaned, the section 40, similar to the section 31 of the embodiments according to FIGS. 1 and 3, passes over into a plane section 33 in a bend which is opposite to its bend.

Similar to the middle section 31 in the embodiment according to FIGS. 1 and 2, in the embodiment according to FIGS. 4 and 5 a stop 35 is cut out of the section 40. The stop tangentially points away from the section slightly inclined downwards. Like the stop 35 in the embodiment according to FIG. 1 and 2, the stop 35 according to the FIGS. 4 and 5 is also connected with the section 40 in the area of the highest point of said section 40.

In the embodiment according to FIG. 6 the section 40 is rolled in the opposite direction to the one according to FIGS. 4 and 5. Consequently, the free end of the section 40 is situated at the top side 42 of the sheet metal section 33 lying opposite of the windshield 26. The section 40 tangentially changes into the plane section 33, and the offset arrangement of the axis of the retainer 20 from the plane of section 33 will be obtained by the rolling direction of the section 40.

A stop 35 for the joint piece 12 in turn is cut out of the section 40 and extends vertically upwardly starting tangentially from the section 40 similar to the stops 35 of the embodiment according to FIG. 3. The stop 35 is connected with the section 40 in about the height of the axis of the retainer 20.

In both embodiments according to FIGS. 4 and 5, on the one hand, and FIG. 6, on the other hand, the stop 35 is connected with the section 40 distant from the free end thereof so that, at least before the rolling of the sheet metal, its free end shows into the same direction as the free end of a section 40. However, it is also possible to cut the stop 35 out of the sections 40 in such a way that its free end shows in the opposite direction. In the embodiment according to FIGS. 4 and 5 the stop 35 would stand up similar to the embodiment according to FIG. 6, in the embodiment according to FIG. 6, however, similar to the embodiment according to FIGS. 4 and 5, it would jut out to a greater extent in longitudinal direction of the wiper arm.

In the embodiment according to FIGS. 4 and 6 it is especially easy to manufacture the free end of the bent section 40 slightly longer than shown and, for example, to weld it with the sheet metal section 33. In this way the retainer 20 becomes especially stable.

The fixing part 10, according to the FIGS. 7 and 8, again comprises a flat section 33 with a conical bore 23 and an opening 24. Similar to the embodiments according to FIG. 1 through 3 the retainer 20 is formed by three sections 30, 31, 32, which lie behind each other in axial direction. As in the embodiment according to FIGS. 1 through 3, the middle section 31 is bent into the opposite direction of the two outside sections 30 and 32 and surrounds the retainer 20 at the top, while the sections 30 and 32 surround the retainer 20 at the bottom close to the windshield 26. Different from the two embodiments according to FIGS. 1 and 3, however, the sections 20, 31 and 32 are now connected with one another on both sides of the retainer 20, consequently they do not have a free end. Only in the area of the retainer 20 are they separated from each other by longitudinal sections so that it is possible to bend them into opposite directions.

Similar to the embodiments of FIGS. 1 and 4, in the embodiment according to FIGS. 7 and 8 it is possible to cut a stop for the joint piece out of the middle section 31.

Also from FIG. 7 can be seen that the sheet metal, on the whole, is slightly bent upwards in front of the retainer 20. In this way the axis of the retainer 20 is offset from the plane of the section 33 to a higher extent so that the lever arm, which is effective for the power of the pressure spring 16 is greater than in an embodiment, in which the sections 30 and 32 tangentially change into the section 33.

FIG. 9 shows a fixing part 10 made of sheet metal with a conical bore 23 and with an opening 24 for hanging up a bow 25, from which in turn a pressure spring 16 is suspended.

The retainer 20 is formed by rolling a sheet metal section 40 similar to the embodiment according to FIGS. 4 and 5. However, the fixing part 10 is inclined downwards, this means towards the windshield 26 which is to be cleaned, in the area of the opening 24 so that the bow 25 bears against the edge of the opening 24 which it shares with the bottom side 41 of the sheet metal. This means that the distance A, important for the effective lever arm between the axis of the retainer 20 and the line of effect of the spring 16, is maximized, while the overall height is equal. In the embodiment according to FIG. 9 this overall height is now as before defined by the outside diameter of the bent section 40, as the maximum distance of the sheet metal of the plane section 33 in the area of the downward inclination is not larger than in the area of the section 40.

The edge 43 against which the bow 25 bears is rounded by an additional embossing, as can be seen from FIG. 10.

In all embodiments and in principle in a wiper arm according to the invention, it is possible to cover the fixing part 10 with a plastic cap, which is latched onto the projecting sections of the bearing bushing 21 in the conventional way.

What is claimed is:

1. A wiper arm assembly comprising:

an elongated fixing part formed from a single, elongated, flat strip of metal, said strip defines a plane and has first and second ends, and spaced, lateral edges;

said first end of said part having upper and lower planar surfaces and said first end of said part having means for fixing said part to a wiper shaft;

said second end of said part has annular retaining means for receiving and retaining an annular bearing bush therein, said retaining means defining a pivot axis, said retaining means is formed by the entire second end of said strip being bent out of the plane in one direction, parallel to the pivot axis, to form an inner curved surface and an outer curved surface;

an annular bearing bush received in said retaining means, said bearing bush has an outer surface which engages and is held by said inner curved surface; and a joint piece pivotally coupled to said retaining means for pivotal movement about said pivot axis, said joint piece having means for coupling a wiper blade with said joint piece.

2. A wiper arm assembly as recited in claim 1, wherein said second end includes a terminal end disposed adjacent said upper planar surface of said first end.

3. A wiper arm assembly as recited in claim 1, said second end further comprising a stop separated from and projecting away from said outer curved surface of said second end.

* * * * *